A. Q. Allis'
Impd. "Sulky Plough."

PATENTED
FEB 11 1868

74268

Witnesses.
J. R. Hopkins
Albert R. Swett

Inventor.
A. Q. Allis
by Drindle & Co.

United States Patent Office.

A. Q. ALLIS, OF DAYTON, OHIO.

Letters Patent No. 74,268, dated February 11, 1868.

IMPROVEMENT IN SULKY-PLOUGH.

The Schedule referred to in these Letters Patent and making part of the same.

TO ALL WHOM IT MAY CONCERN:

Be it known that I, A. Q. ALLIS, of Dayton, in the county of Montgomery, and State of Ohio, have invented a certain new and improved Sulky-Plough; and I do hereby declare that the following is a full and exact description thereof, reference being had to the accompanying drawings, making a part of this specification, in which—

Figure 1:
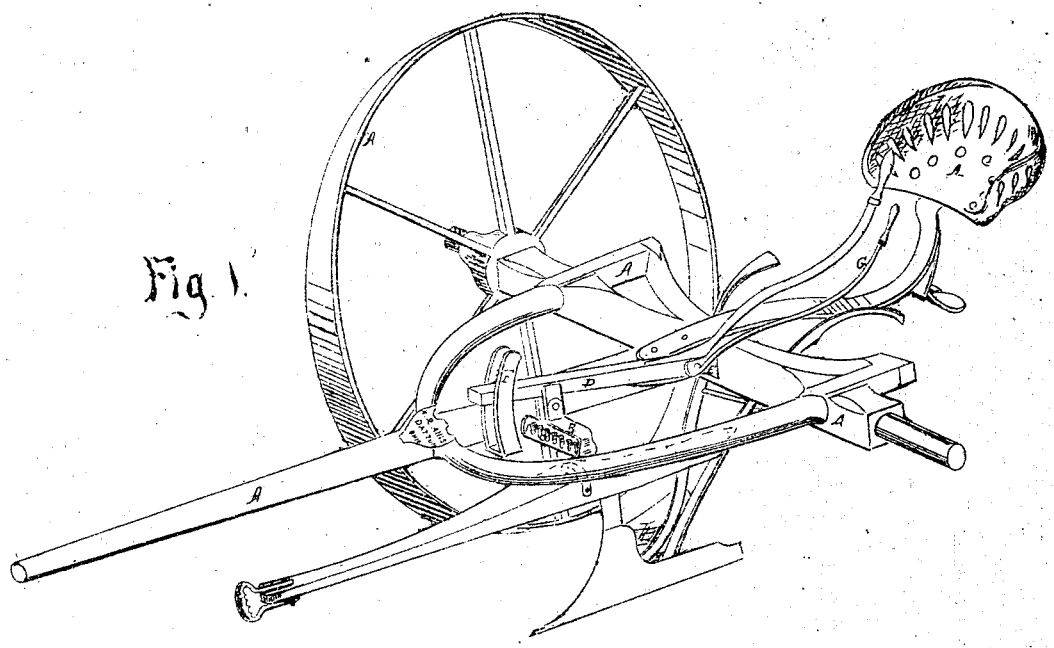
Figure 2:
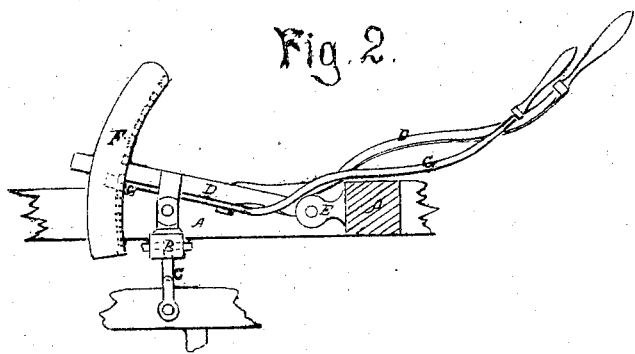
Figure 3:
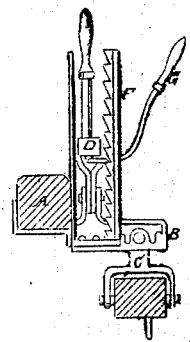

Figure 1 is an isometrical view,
Figure 2 a side elevation, and
Figure 3 a cross-section.

The nature of this invention consists, first, in connecting a plough to a sulky by means of a clevis, working in a serrated link, and attaching the horses to the plough-beam by the ordinary means, so that the driver, while riding upon the sulky, can direct the movements of the plough as easily as, and with greater convenience than, if walking behind the plough; second, in attaching the plough by means of the aforesaid link to a bar or lever, one end of which is attached to the axle by a joint, while the other can be raised or lowered by a handle, within convenient reach of the driver, and is kept in position by guide-bars with a series of teeth, in which a catch is engaged or released by a lever, the whole forming a means for raising or lowering the plough as occasion may require; third, in the serrated or toothed link, to which the plough is attached by means of a clevis and pin, which holds the plough firmly in position, and, by changing the position of the clevis and pin, allows the ploughing of a wide or narrow furrow, as is desired.

Letters of like name refer to like parts in each of the figures.

A represents the wheels, frame, &c., of the sulky; B represents the serrated link, in which the clevis C is held by a pin resting in the teeth; D is the bar or lever attached to the axle by a joint, E, which allows the end to move vertically between the guide-bars F; G is the catch and lever, engaging the teeth in the guide-bars F.

The principal advantages that my improved sulky-plough has over others of this kind now in use are, that while allowing the horses to be attached directly to the plough by the common method, it gives the driver complete control of it, enabling him to plough a deep or shallow, wide or narrow furrow, or to lift the plough entirely above the ground when going to or returning from the field, and, that while more easy to operate than others, it is more simple in its operation and construction, and less liable to get out of repair.

When the driver wishes to raise the plough from the ground, he disengages the catch G by means of the lever, and presses downwards upon the lever D, the front end of which is raised, bringing with it the plough.

What I claim as my invention, and desire to secure by Letters Patent, is—

1. The serrated link B, or its equivalent, for the purposes and substantially as herein described.
2. The lever and bar D, or its equivalent, used for the purpose substantially as herein set forth.
3. The combination and arrangement of the guide-bars F and the catch and lever G, for the purpose and substantially as herein set forth.
4. The combination of the several parts, for the purpose and substantially as herein set forth.

A. Q. ALLIS.

Witnesses:
WM. MITCHELL,
THOS. D. MITCHELL.